(12) United States Patent
Iiyama et al.

(10) Patent No.: US 10,046,599 B2
(45) Date of Patent: Aug. 14, 2018

(54) ELECTRICAL BRAKE MECHANISM FOR CASTER

(71) Applicant: NANSIN CO., LTD., Tokyo (JP)

(72) Inventors: Noriyuki Iiyama, Inzai (JP); Yuya Kita, Inzai (JP)

(73) Assignee: NANSIN CO., LTD., Tokyo (JP)

( * ) Notice: Subject to any disclaimer, the term of this patent is extended or adjusted under 35 U.S.C. 154(b) by 0 days.

(21) Appl. No.: 15/100,171

(22) PCT Filed: Jul. 15, 2014

(86) PCT No.: PCT/JP2014/068833
§ 371 (c)(1),
(2) Date: Jul. 13, 2016

(87) PCT Pub. No.: WO2015/079735
PCT Pub. Date: Jun. 4, 2015

(65) Prior Publication Data
US 2017/0008340 A1    Jan. 12, 2017

(30) Foreign Application Priority Data

Nov. 29, 2013   (WO) .................. PCT/JP2013/082277

(51) Int. Cl.
*B60B 33/02*   (2006.01)
*B60B 33/00*   (2006.01)

(52) U.S. Cl.
CPC ........ *B60B 33/026* (2013.01); *B60B 33/0086* (2013.01); *B60B 33/021* (2013.01); *B60B 33/025* (2013.01); *B60B 33/028* (2013.01); *B60B 2900/325* (2013.01)

(58) Field of Classification Search
CPC ... B60B 33/021; B60B 33/025; B60B 33/026; B60B 33/0078; B60B 33/0081; B60B 33/0086; B60B 33/0092
USPC .......................................... 188/1.12; 16/35 R
See application file for complete search history.

(56) References Cited

U.S. PATENT DOCUMENTS 8,047,339 B2 * 11/2011 Park ...................... B60T 13/741
                                                        188/156
2004/0117943 A1 *  6/2004 Block ................. B60B 33/0039
                                                         16/18 R

FOREIGN PATENT DOCUMENTS

WO   WO 2015079584 A1 *  6/2015 ........... B60B 33/028

* cited by examiner

*Primary Examiner* — Thomas J Williams
(74) *Attorney, Agent, or Firm* — Westerman, Hattori, Daniels & Adrian, LLP (57) ABSTRACT

An electrical brake mechanism for a caster can reliably brake a caster. A switch is mounted on a target to which a caster is attached and outputting an instruction signal to a brake device, a detector is provided on a rotating shaft of the cam and arranged in correspondence with each of positions of a plurality of cam surfaces, a sensor is provided for detecting abutment between each of the cam surfaces and an operation shaft by the detector, a motor is provided for rotating by an input of the switch and for stopping if the sensor detects the position of the predetermined cam surface, and a gear train is provided for transmitting rotation of the motor to the rotating shaft of the cam.

11 Claims, 9 Drawing Sheets

ELECTRICAL BRAKE MECHANISM FOR CASTER

TECHNICAL FIELD

The present invention relates to an electrical brake mechanism for a caster which can reliably perform brake control of a caster.

BACKGROUND ART

Conventionally, in a caster including a solenoid operated brake mechanism of Japanese Patent Laid-Open No. 2001-58503, constitution is disclosed in which, for example, a caster frame, a pair of caster wheel supported on both ends of a horizontal shaft of the caster frame rotatably by the horizontal shaft, and a plunger moving forward/backward with respect to the caster frame by exciting the solenoid are provided, a hook interlocking with the plunger is provided on the caster frame, and an engagement portion engaging/disengaged with the hook is provided on a side surface of the caster frame of the caster wheel, and by turning on/off a switch provided on an arm rest of standing auxiliary chair, for example, the solenoid is excited, whereby the plunger is vertically moved.

Moreover, in a self-help device for indoor movement in Japanese Patent Laid-Open No. 2012-210237, a brake mechanism in which a caster is braked by a load in a predetermined range detected by a load sensor is provided, and regarding the brake mechanism, constitution having a motor capable of forward/backward rotation disposed on a mounting portion of the caster, a warm gear driven by the motor, a pressing-down arm driven by the warm gear, a rotating-shaft stop gear and a caster-wheel stop arm driven by the pressing-down arm, and a spring as an interference preventing mechanism for enabling operations of both the caster rotating-shaft stop gear and the caster-wheel stop arm is disclosed.

Since they can both omit a pedal or a lever used in a brake operation of a conventional caster, even in the case where a target such as a bed, a chair, a table or the like to which the caster is attached is installed in a narrow place, the brake operation can be performed by a switch or a load sensor at hand and thus, the brake operation can be performed easily.

However, in the former, the solenoid is operated by turning-on/off of the switch, while in the latter, a load applied on a seat surface of a seating portion is detected so as to perform the brake operation, and thus, there are problems that the brake control is not performed due to malfunction of the brake mechanism and the like or if the brake is not fully engaged, it cannot be confirmed.

Particularly, in National Publication of International Patent Application No. 2004-516991, in a roller or particularly a caster type roller capable of fixing a rotating operation of a driving wheel and a turning operation of the running wheel, including an operation shaft penetrating a control cam of the roller, and has an electric motor act on the operation shaft through a gear mechanism so as to drive the operation shaft, constitution in which the electric motor acts on the operation shaft using an electric motor shaft through the toothed gear mechanism is disclosed.

In the caster type roller, since the electric motor and a coil portion of the motor are connected to each other in a series, they extend in one way which makes obstruction, and the caster type roller including the electric motor cannot have its stem mounted on a normal cylindrical mounting portion and needs to be mounted to a carrier of a chassis through an attachment, and thus, the caster type roller including the electric motor cannot be used singularly, and there is also nonconformity that the electric motor protrudes long to the outer side.

CITATION LIST

Patent Literature

Patent literature 1: Japanese Patent Laid-Open No. 2001-58503
Patent literature 2: Japanese Patent Laid-Open No. 2012-210237
Patent Literature 3: National Publication of International Patent Application No. 2004-516991

SUMMARY OF INVENTION

Technical Problem

A problem to be solved by the present invention is to provide an electric brake mechanism for a caster which is compact and can reliably control a brake device by detecting a position of a cam surface of caster braking and braking release by a sensor and can be used in combination even if it is a single body.

Solution to Problem

The present invention is an electric brake mechanism for a caster including a stem installed upright on a support yoke pivotally supporting a wheel, a cam incorporated in an upper part of the stem and rotating by a rotating shaft, cam surfaces for braking lock and unlocking formed in plural at predetermined spots on an outer peripheral surface of the cam, an operation shaft abutting against the cam surface and displaced, and a brake device for braking and releasing braking of the wheel in conjunction with the displacement of the operation shaft, including:

a switch mounted on a target to which the caster is attached and outputting an instruction signal to the brake device, a detector provided on the rotating shaft of the cam and arranged in accordance with each position of the plurality of cam surfaces, a sensor for detecting abutment between each of the cam surfaces and the operation shaft by the detector, a motor rotating by an input of the switch and stopping when the position of the predetermined cam surface is detected by the sensor, and a gear train for transmitting rotation of the motor to the rotating shaft of the cam, with respect to a gear box in which the gear train is stored, a storage box storing the motor is fixed to the gear box by crossing it at a right angle and extending in parallel with the same direction as the rotating shaft protruding from the gear box to the caster side, one end of a connecting plate extending in a direction orthogonal to an extending direction of the rotating shaft is fixed to the stem of the caster, and the connecting plate has the other end side of the connecting plate fixed to the storage box of the gear box or the motor and supporting the storage boxes of the gear box and the motor.

Here, the term "braking lock" is used as a word including a narrow meaning of braking for stopping rotation of a wheel and control of turning regulation of the support yoke.

Advantageous Effect of Invention

In the present invention, since even a single body can be mounted on a conventional cylindrical caster mounting portion so that the existing caster can be replaced without changing amounting height, only one caster can be braked, and if an interlocking mechanism is provided, a plurality of the casters can be braked at the same time, which provides usability, and since the storage boxes for the gear box and the motor are arranged having an L-shape, they can be arranged at aright angle so as to surround the stem of the caster at the center at all times, and thus, an electrical brake mechanism for a caster which is compact and does not make obstruction in use can be provided.

Moreover, since the storage boxes for the gear box and the motor are fixed to the storage box of the gear box or the motor by the connecting plate fixed to a base end of the stem, the storage boxes for the gear box and the motor can be mounted in any direction around the stem with respect to the caster, and they do not make obstruction in use.

Furthermore, by providing the detection sensor in the gear box, the detector provided on the gear for driving can be detected, and displacement of the cam can be accurately detected.

Moreover, by interposing a torque limiter in the gear train, safety can be improved.

Moreover, by adding a timer lock circuit, by configuring such that automatic lock is performed after a certain period of time even if a user forgets to lock, a locking error can be substantially eliminated.

BRIEF DESCRIPTION OF THE DRAWINGS

FIG. 6(*a*) is a view illustrating a gear train in a gear box in a turning regulated/braked state.

FIG. 6(*b*) is a side view illustrating a brake device of the caster in the turning regulated/braked state.

FIG. 7(*a*) is a view illustrating the gear train in the gear box in the turning regulated state.

FIG. 7(*b*) is a side view illustrating the brake device of the caster in the turning regulated state.

FIG. 8(*a*) is a view illustrating the gear train in the gear box in an unlocked state.

FIG. 8(*b*) is a side view illustrating the brake device of the caster in the unlocked state.

FIGS. 12(*a*) to (*d*) are plan views illustrating different arrangement in the case in which a connecting plate is fixed to a storage box of a motor, respectively.

FIG. 13(*a*) is a plan view of the gear box, the storage box, and the connecting plate.

FIG. 13(*b*) is a side view of the gear box, the storage box, and the connecting plate.

FIG. 13(*c*) is a view illustrating a plane and a side surface of a torque limiter.

DESCRIPTION OF EMBODIMENT

The present invention can control a brake device by providing a switch mounted on a target to which a caster is attached and outputting an instruction signal to the brake device, a detector provided on a rotating shaft of the cam and arranged in accordance with a position of each of a plurality of cam surfaces, a sensor for detecting abutment between each of the cam surfaces and an operation shaft by a detector, a motor rotating by an input of the switch and stopping if a position of a predetermined cam surface is detected by the sensor, and a gear train transmitting rotation of the motor to the rotating shaft of the cam and by checking the position of the cam surface.

Embodiment 1

Figure 1:
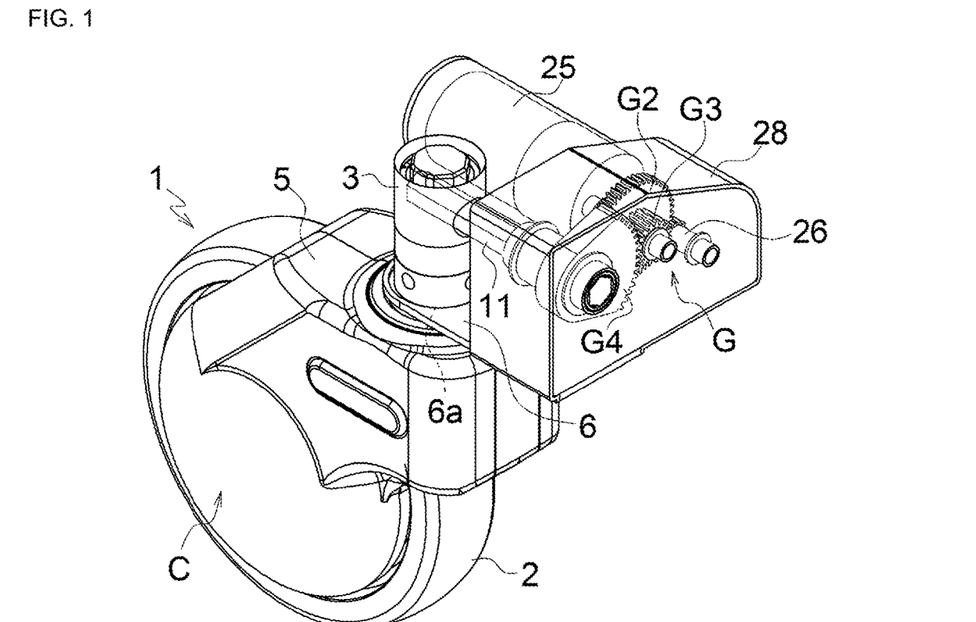
FIG. 1 is a perspective view of a caster having an electrical brake mechanism seen from one side.
Figure 2:
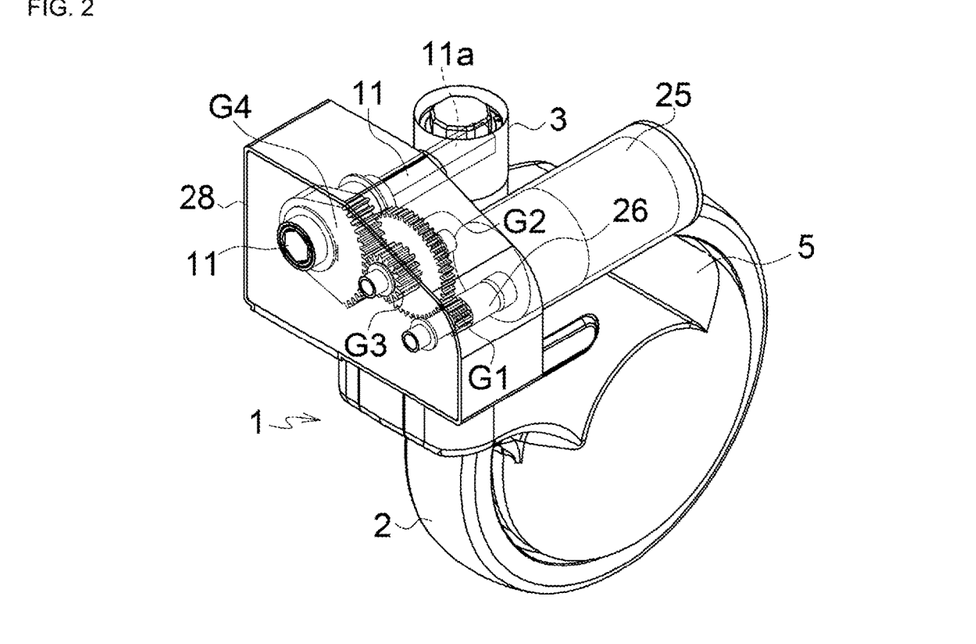
FIG. 2 is a perspective view of a caster having an electrical brake mechanism seen from the other side.
Figure 3:
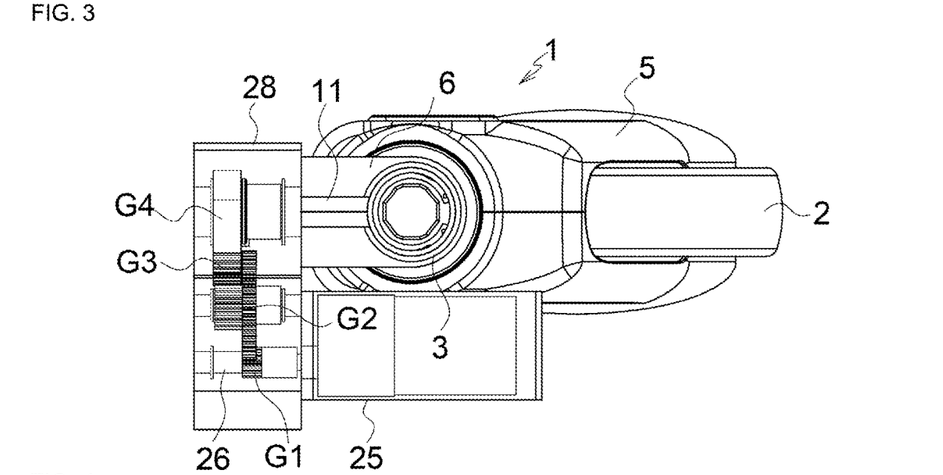
FIG. 3 is a plan view of the same.

FIGS. 1 and 2 are perspective views of an embodiment of a caster of the present invention and a state in which a gear in a gear box is seen through.

Figure 6A:
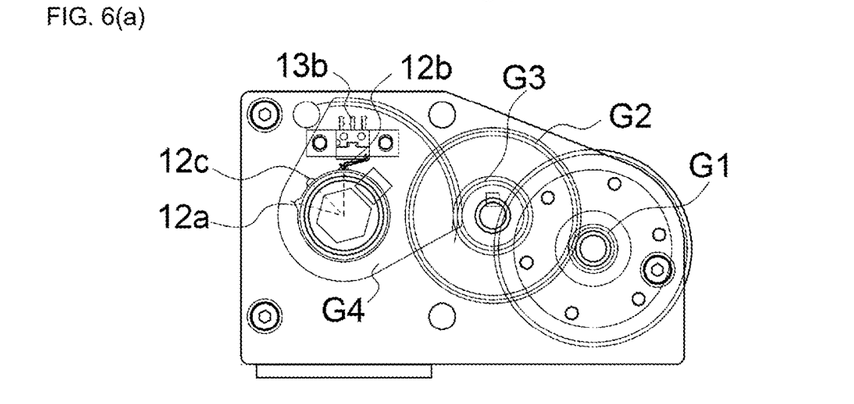
Figure 6B:
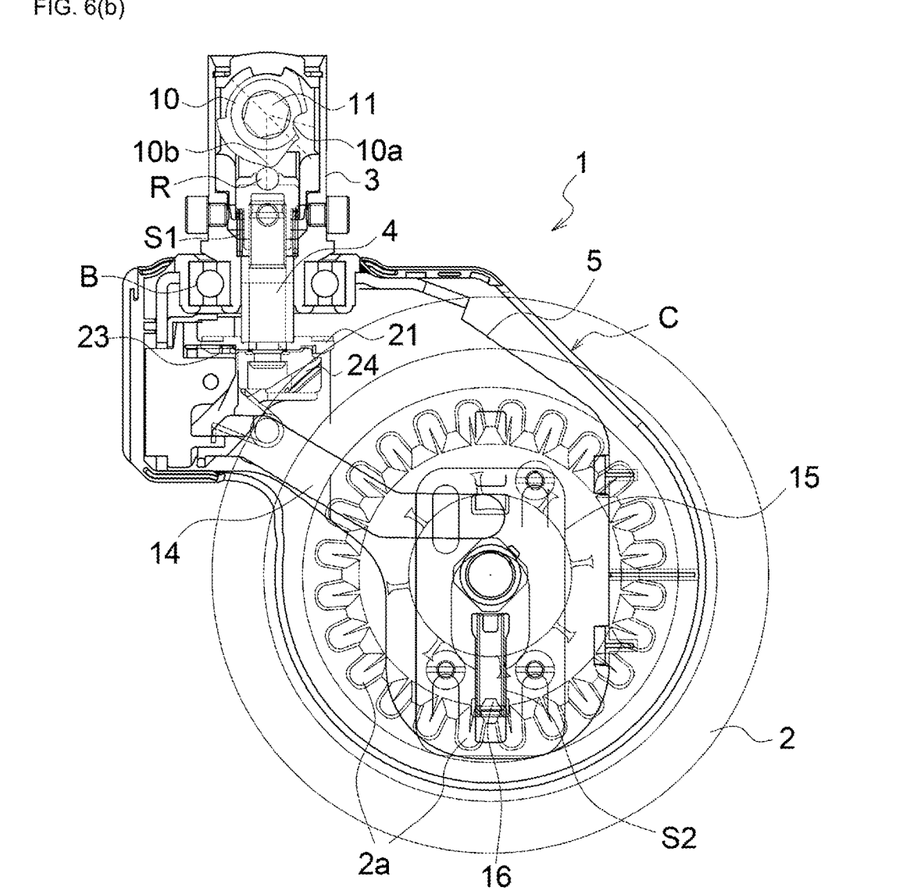

This caster 1 includes, as illustrated in FIGS. 6(*b*) to 6(*b*), a stem 3 installed upright on a support yoke 5 pivotally supporting a wheel 2 through a bearing portion B, a cam 10 incorporated in an upper part of the stem 3 and rotating by a a rotating shaft 11, cam surfaces 10*a* to 10*c* formed in plural at predetermined spots on an outer peripheral surface of the cam 10 for braking and for releasing braking, an operation shaft 4 which abuts against the cam surfaces 10*a* to 10*c* and is displaced, and a brake device for braking lock and unlocking the wheel 2 in conjunction with the displacement of the operation shaft 4.

Moreover, the rotating shaft 11 is made of a shaft having a polygonal section (hexagonal section in the illustrated example) and is fitted and mounted in a hole 11*a* formed at a center of the cam 10 through a hole of the stem 3 and having the same sectional shape.

On the other hand, on a target 50 (a bed, a wheel chair, a table and the like, for example) to which the caster 1 is attached, a switch 30 for outputting an instruction signal to the brake device is provided.

Figure 4:
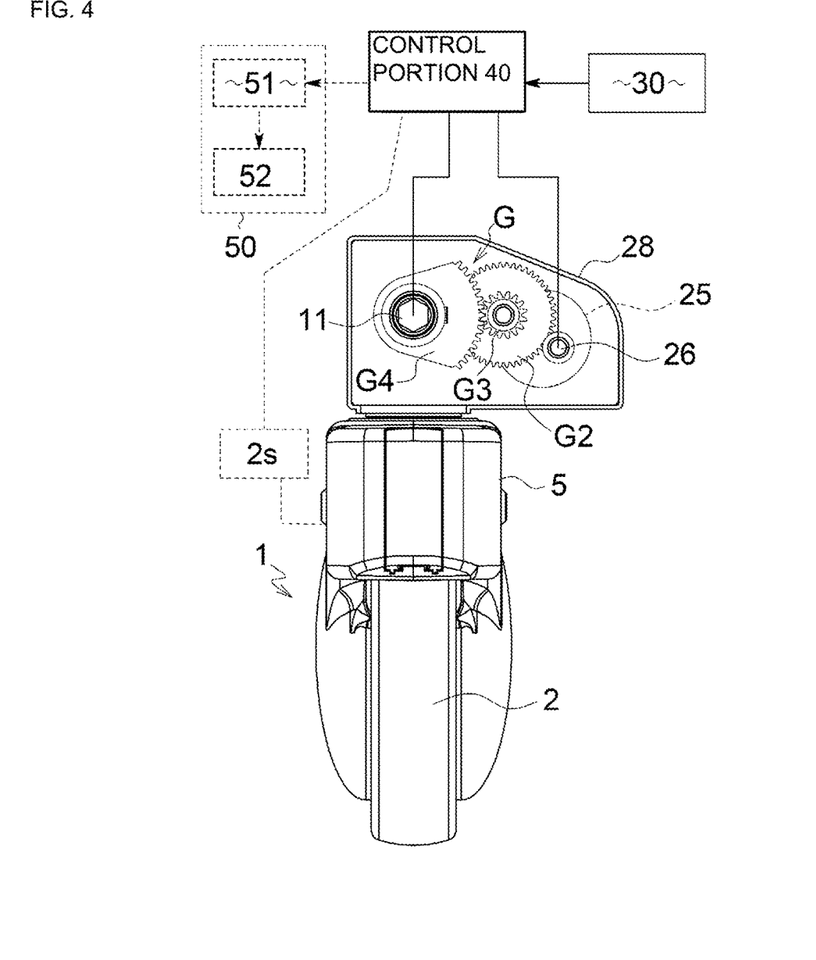
FIG. 4 is a back surface and block diagram of the caster.

That is, as illustrated in FIG. 4, a turning regulation instruction, a turning regulation/braking instruction from the switch 30 or a detection signal of unlocking instruction and a detection signal of sensors 13*a* to 13*c* which will be described later are input into a control portion 40, and the control portion 40 controls the motor in a casing 25 on the basis of that.

Figure 10:
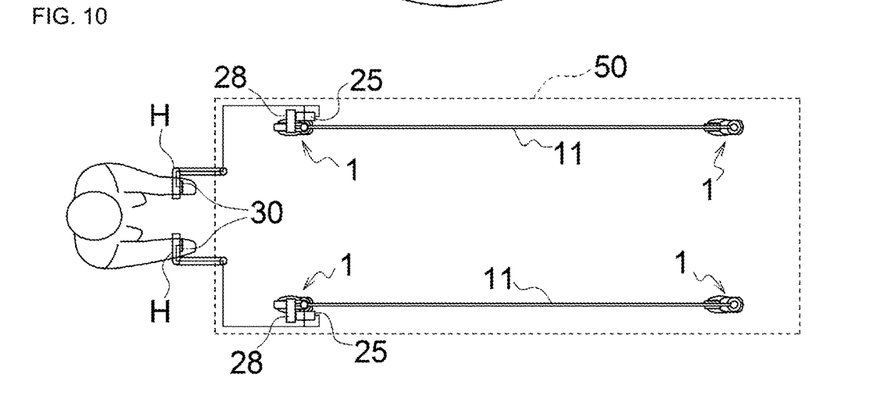
FIG. 10 is a schematic diagram illustrating that a switch is provided on a handle of a target including the caster.

Subsequently, the braking lock of the caster can be released by gripping a handle H so as to move the target by providing the switch 30 on a grip portion of the handle H to be gripped when the bed is to be moved as illustrated in FIG. 10 as an example.

Figure 7A:
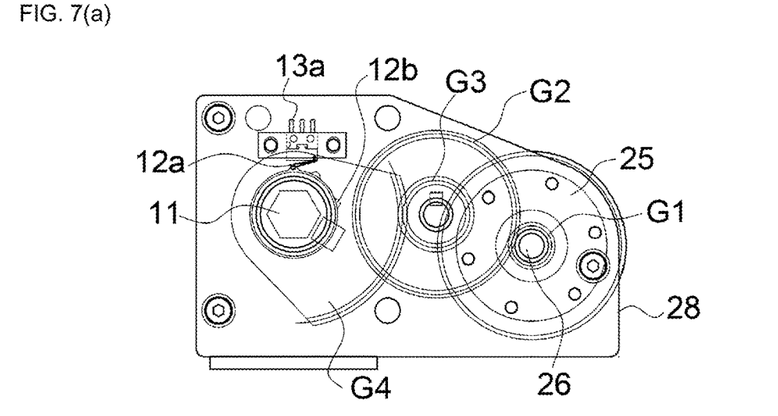
Figure 7B:
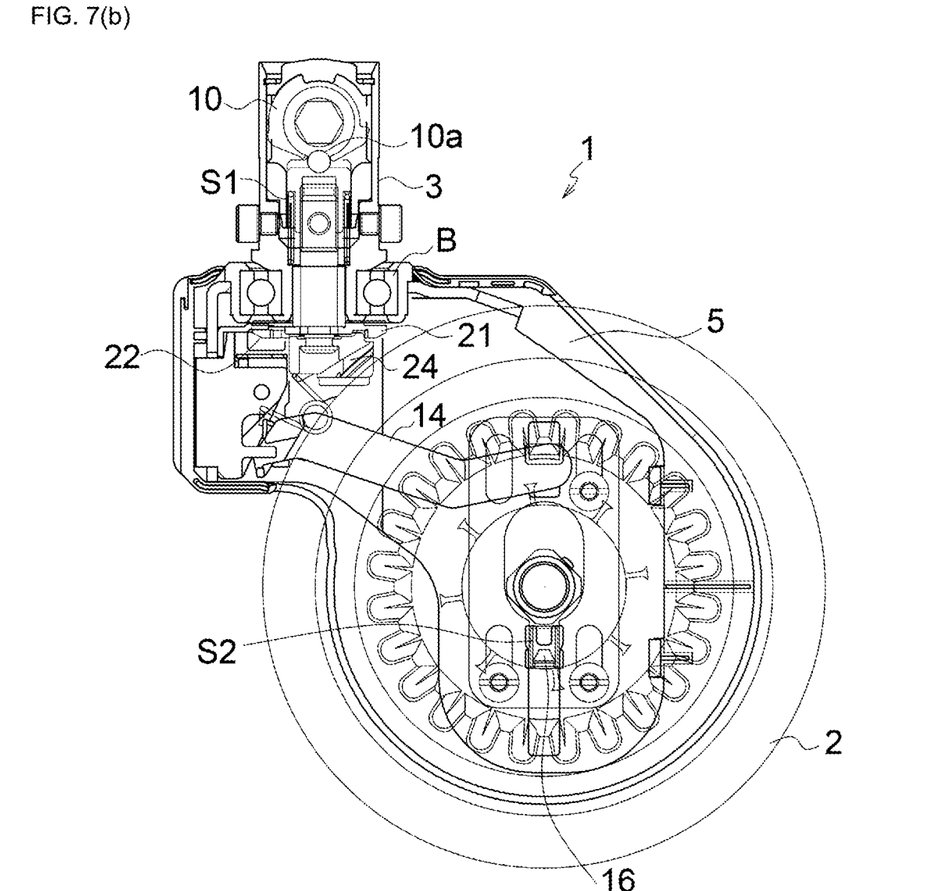
Figure 8A:
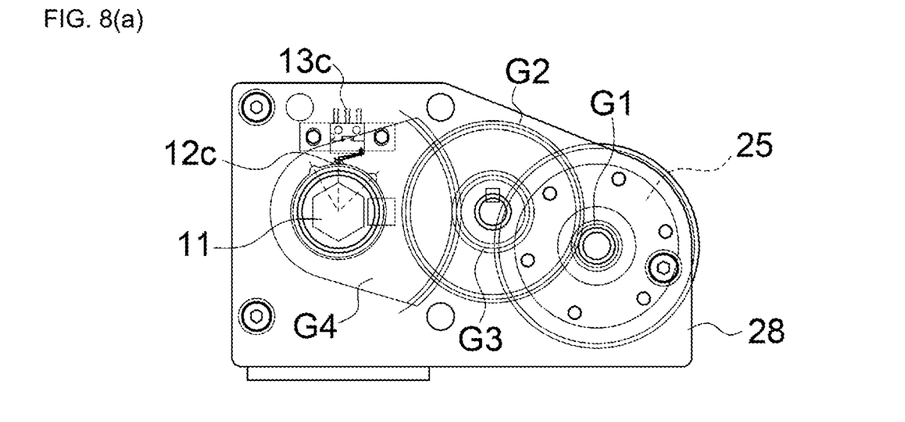
Figure 8B:
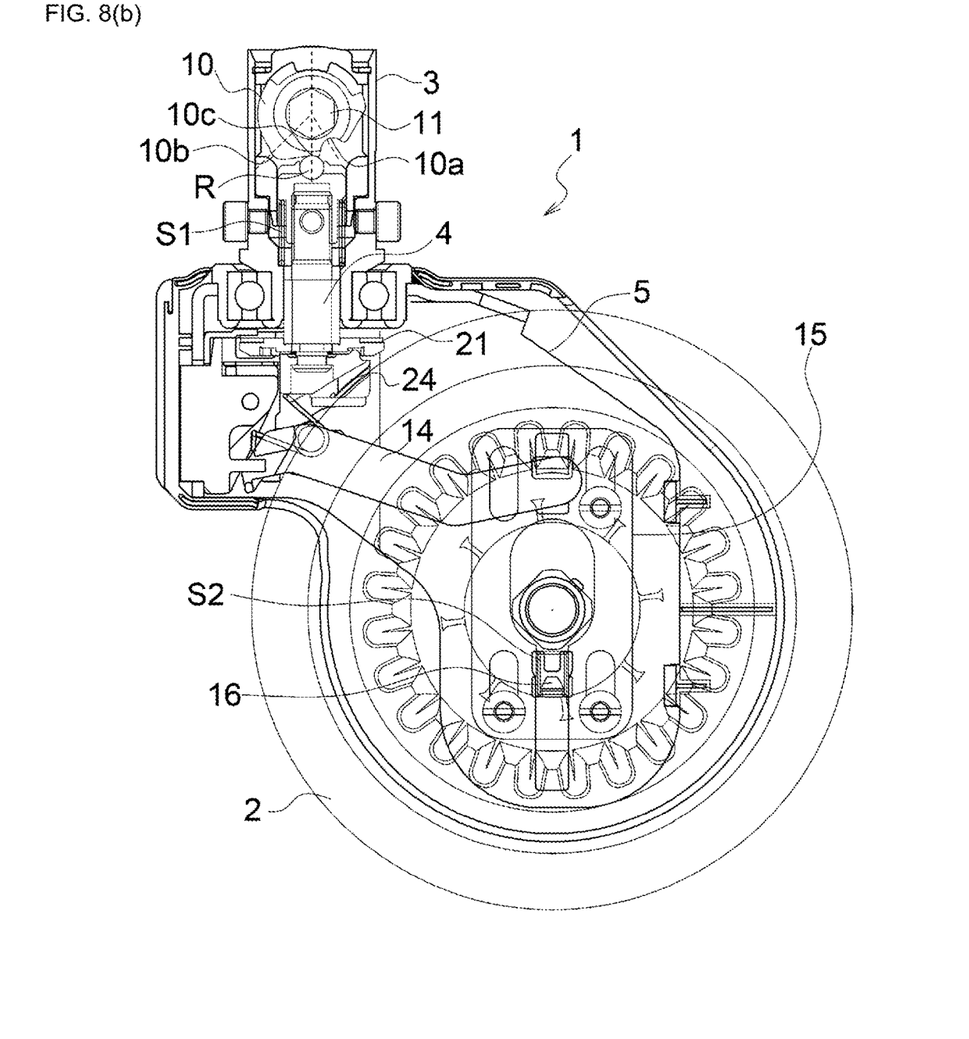
Figure 9:
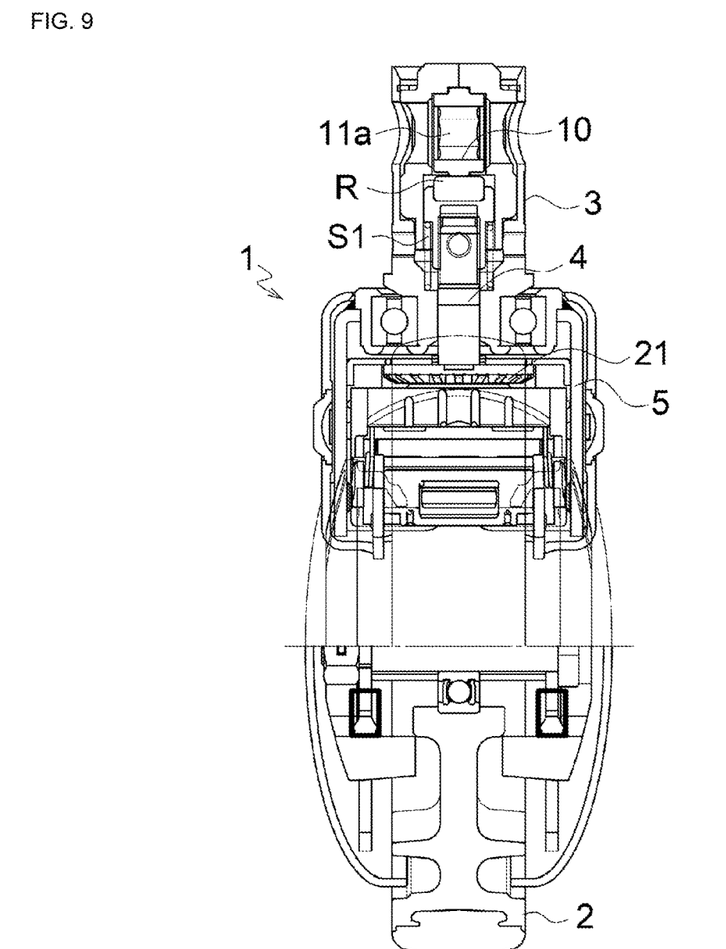
FIG. 9 is a sectional view of the caster.

Moreover, as illustrated in FIGS. 6 to 8, detectors 12*a* to 12*c* provided on the rotating shaft 11 of the cam 10 and arranged in correspondence with each of positions of the plurality of cam surfaces 10*a* to 10*c* provided on the cam 10, the sensors 13*a* to 13*c* for detecting abutment between each of the cam surfaces 10*a* to 10*c* and the operation shaft 4 by the detectors 12*a* to 12*c*, a motor in the casing 25 rotating by an input of the switch 30 and stopping upon detection of the position of the predetermined cam surface by the sensors 13*a* to 13*c*, and a gear train G for transmitting rotation of the motor to the rotating shaft 11 of the cam 10 are provided.

In this embodiment, the cam surface includes the first cam surface 10*a* performing turning regulation, the second cam surface 10*b* performing turning regulation/braking, and the third cam surface 10*c* performing unlocking.

In the illustrated example, the third cam surface 10*c* is provided at a neutral position at the center, the second cam surface 10b is arranged in a clockwise direction in the figure, and the first cam surface 10a is arranged in a counterclockwise direction in the figure.

Then, the detectors 12a to 12c provided on the rotating shaft 11 are formed of the first detector 12a corresponding to the first cam surface 10a, the second detector 12b corresponding to the second cam surface 10b, and the third detector 12c corresponding to the third cam surface 10c, and the sensor is formed of the first sensor 13a for detecting the first detector 12a, the second sensor 13b for detecting the second detector 12b, and the third sensor 13c for detecting the third detector 12c.

Then, in this embodiment, the detectors 12a to 12c are fixed to/provided on the rotating shaft 11 of the cam 10 stored in a gearbox 28 which will be described later, and the sensors 13a to 13c are also mounted in the gear box 28.

In this embodiment, the detectors 12a to 12c are formed of projecting portions fixed to the rotating shaft 11 of the cam 10, and the detection sensors 13a to 13c are formed of limit switches which are brought into contact with the projecting portions and detecting positions of the projecting portions, but in this invention, it may be another contact switch or a non-contact switch may be used.

Moreover, this invention may have a structure in which the detector is provided at a spot separated from the cam surface of the cam 10, and the position of the cam surface is detected by the sensor provided in the stem 3.

The gear box 28 is supported together with the cylindrical casing 25 which is the storage box for the motor through a connecting plate 6 made of a square-tube box shape and fixed to the stem 3 and bears the gear train G in the illustrated example, but in this invention, it is only necessary that the gear train G is pivotally supported, and its section can be a channel shape or any other arbitrary shapes.

The gear box 28 is faced by being separated from the stem 3 at a predetermined interval, and the other end of the connecting plate 6 whose one end is fixed to a bottom wall surface of the gear box 28 is fixed to the base end side of the stem 3.

Moreover, on the stem 3 side in a direction crossing an extending direction of the gear box 28, the casing 25 for the motor is arranged, and a tip end of the casing 25 is fixed to a side wall of the gear box 28 and is supported at a neutral position.

Then, since the casing 25 is arranged in parallel with the rotating shaft 11 in the same direction toward the stem 3 as that of the rotating shaft 11 of the cam 10 protruding from the gearbox 28, the gear box 28 and the casing 25 for the motor are arranged having an L-shape on a plan view around the stem 3 at an interval for mounting the stem, and thus, they do not become bulky nor make obstruction in use.

In other words, the tip end of the casing 25 is fixed to one side (tip end side) of end portions of the gear box 28 at a right angle, an output shaft 26 is connected to the rotating shaft of an operating gear G1 at the tip end which is an input side of the gear train G, while a rotating shaft of a driving gear G4 on a rear end which is an output side of the gear train G extends in the same direction as that of the operating gear G1 on the input side and is connected to the rotating shaft 11 of the cam so that rotation of the output shaft 26 of the motor is decelerated and transmitted to the rotating shaft 11 of the cam 10.

The gear box 28 and the casing 25 are fixed to each other and fixed to the stem 3 of the caster 1 through the connecting plate 6.

That is, the connecting plate 6 has its base end fixed to a bottom surface and/or an upper surface of either one of the gear box 27 and the casing 25 and has its tip end fixed to the stem 3 by fitting the stem 3 of the caster 1 in a hole 6a provided on the tip end side by welding or the like.

Figure 5:
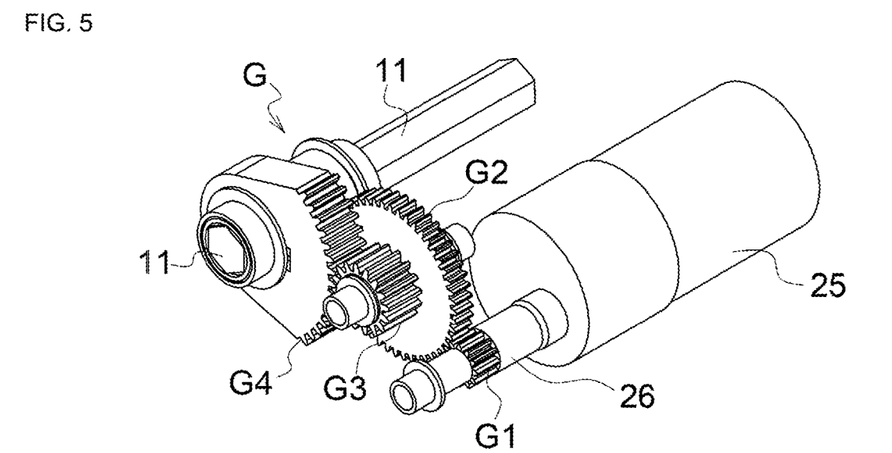
FIG. 5 is a perspective view of a gear transmission mechanism.

As illustrated in FIG. 5, the output shaft 26 of the motor is connected to the rotating shaft of the operating gear G1.

The operating gear G1 is meshed with a first relay gear G2 with a large diameter, while a second relay gear G3 with a small diameter provided coaxially with the first relay gear G2 is meshed with a driving gear G4 mounted on the rotating shaft 11 of the cam 10 so that the rotating shaft 11 of the cam 10 is rotated in a forward direction or a backward direction with a strong force while reducing a rotation number of the motor.

In the illustrated example, the rotating shaft 11 is inserted into a hole of the gear G4 and serves also as a rotation shaft of the gear G4 and can be withdrawn to an outer side through a window hole of the gear box 28 and thus, at a failure or the like, by withdrawing the rotating shaft 11 and by inserting a shaft having the same section through the window hole and having a tip end inserted into a hole 11a of the cam 10, the cam can be rotated manually for executing brake control.

The present invention is not limited to the aforementioned structure or combination of the gears but in short, the structure only needs to be able to transmit the rotation of the motor to the rotating shaft of the cam 10.

Subsequently, the brake device includes a turning regulation portion for restraining turning of the support yoke and a braking portion for restraining rotation of the wheel in the case of this embodiment.

The turning regulation portion includes a turning stop dish portion 21 fixed to a lower part of the operation shaft 4 and a pair of upper and lower stoppers 22 and 23 engaged with the turning stop dish portion 21 when it is displaced to a predetermined height position.

Moreover, the braking portion is provided doubly, in which one of them is a brake shoe 24 provided below the turning stop dish portion 21 and pressing a tread surface of the wheel, while the other includes an arm 14 pivotally moved in conjunction with the operation shaft 4 and an elevating piece 15 elevated up/down by the arm 14 and having a braking claw portion 16 hooked by a projecting/recessed engagement portion 2a formed on an inner side of the wheel 2.

By means of elevation of the operation shaft 4, displacement is made to a turning regulation position (see FIG. 7) operating only the turning regulation portion, an unlocking position (see FIG. 8) not acting either of the turning regulation portion or the braking portion, and a turning regulation/braking position (FIG. 6) acting both the turning regulation portion and the braking portion.

Therefore, during turning regulation of FIG. 7(b), the turning stop dish portion 21 is engaged with the stopper 22, whereby turning of the support yoke 5 is regulated (directional regulation).

Moreover, in turning regulation/braking of FIG. 6(b), the turning stop dish portion 21 and the stopper 23 are engaged with each other, whereby turning of the support yoke 5 is restrained.

In the illustrated example, the brake shoe 24 presses the tread surface of the wheel 2 at the same time, and the elevating piece 15 is pressed down at the same time, while the braking claw portion 16 enters into a recess portion of the projecting/recessed engagement portion 2a for performing double braking.

During unlocking in FIG. 8(b), the turning stop dish portion 21 comes to an intermediate position not in contact with the stopper 22 or 23 so as to release turning regulation, while the brake shoe 24 leaves the tread surface of the wheel 2, and the braking claw portion 16 goes out of the recess portion of the projecting/recessed engagement portion 2a and releases braking lock.

In this present invention, the structure of the brake device is not limited to the aforementioned constitution, but known braking and turning regulation structures may be used.

Moreover, in this embodiment, the brake control is divided into three stages, that is, turning regulation, turning regulation/braking, and unlocking, but it may be a structure performed in two stages, that is, the turning regulation/braking and unlocking or the unlocking may be further divided into turning regulation release and turning regulation/braking release.

Moreover, in the case of the caster with the support yoke which does not turn, it may be the braking lock and unlock.

As described above, in the brake device of this invention, it is only necessary that the operation shaft slides by rotation of the cam, and the brake device is operated in conjunction with the displacement of the operation shaft and performs locking or unlocking.

In the aforementioned embodiment, the example in which the brake device with one caster is controlled is illustrated, but as illustrated in FIG. 10, for example, by extending the rotating shaft 11 of the cam and by making it coaxial with the rotating shaft of the cam of the caster arranged in the extended direction, brake control can be executed by interlocking the two casters.

Moreover, in this invention, since a state of the brake of the caster can be monitored on an external display (not shown) on the basis of the signal, the state of the caster can be checked on a monitor by a user of a target (a medical bed or the like, for example) or an assistant.

In the present invention, an interlock mechanism to the target 50 can be added on the basis of a detection signal of the cam position of the caster.

For example, the control portion 40 can make the brake state of the brake device of the caster 1 an operation condition of an actuator performing a predetermined operation or operation stop of the target 50 by transmitting a signal (control signal of the motor as necessary) detected by the sensors 13a to 13c to a controller 51 controlling the actuator 52 performing the operation or operation stop of a predetermined structure (elevation or back raising of a bed operated electrically, for example) of the target 50 as indicated by a dot line in FIG. 4 and thus, it can be made to function as a safety device.

For example, an elevation operation of a bed only during the turning regulation/braking of the caster 1 is made possible.

In this embodiment, brake control is automatically executed by turning-on of the switch 30, but a timer-lock mechanism which automatically locks the caster upon detection of a stop state of the caster may be provided.

That is, by providing a detection portion 2s for detecting the stop state of the wheel when the wheel 2 of the caster 1 is stopped and by inputting a signal of the detection portion 2s to the control portion 40, if an input signal of stop of the wheel 2 lasts for a certain period of time, constitution of outputting a brake lock (turning regulation/braking, for example) signal from the control portion 40 to the motor may be added (see FIG. 4).

Moreover, as exemplified in FIG. 10, by providing the switch 30 on the grip of the handle H, it may be so configured that, if the switch 30 is turned on by gripping the handle H in movement of the bed, the control portion 40 unlocks the cam 10 or controls the cam to the direction regulated position, while if the handle H is released, it is also separated from the switch 30, and the control portion 40 may output a control signal for executing control such that displacement is made to the turning regulation/braking position.

In the present invention, a timer lock function of controlling the moor through a delay timer circuit (not shown) in response to an input signal by turning-on of the switch 30 may be provided.

That is, if the switch 30 is turned on and the input signal is output, a delay for a certain period of time is given by the delay timer circuit, and a control signal is output to the motor.

The delay timer circuit may be provided on the switch 30 side or may be provided on the control portion 40 side.

As a result, if running of the target 50 is to be sopped, for example, the caster can be locked by braking or the like when a certain period of time has elapsed after the switch 30 is turned on, and allowance can be provided for preparation for stop.

Embodiment 2

Figure 11:
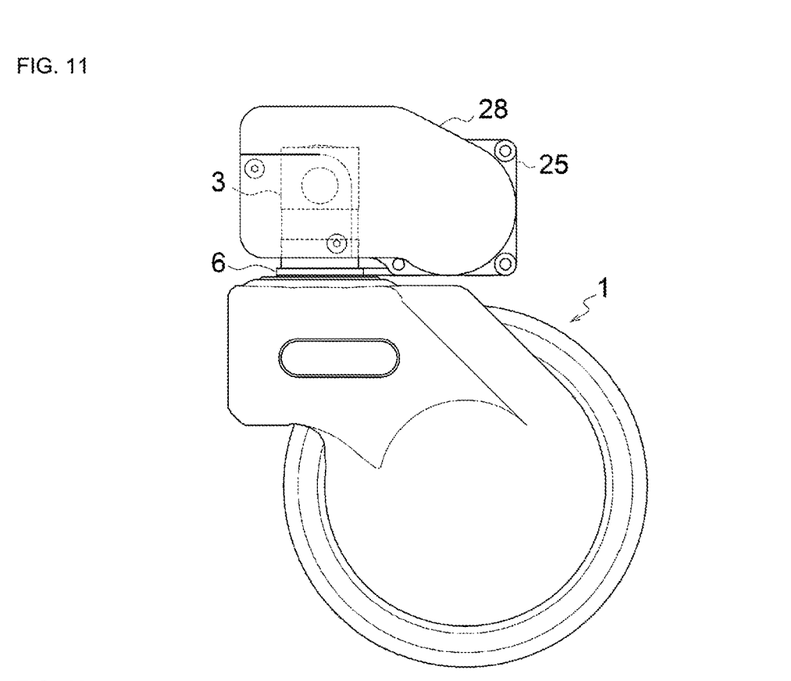
FIG. 11 is a side view of another embodiment.
Figure 12:
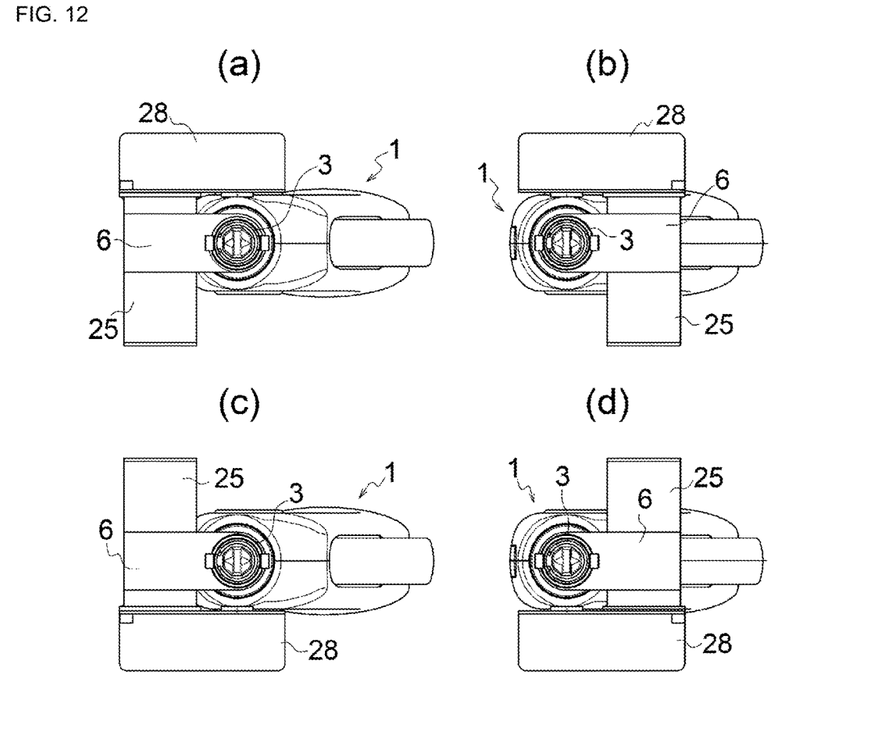
Figure 13A:
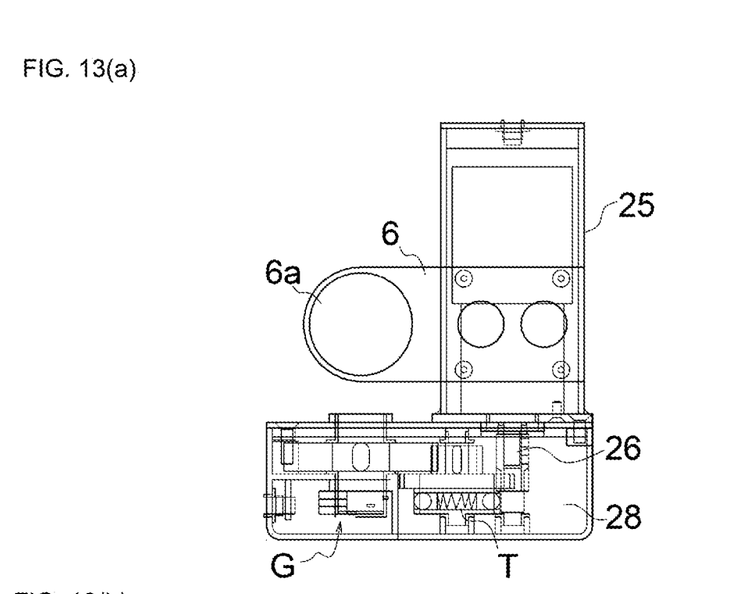
Figure 13B:
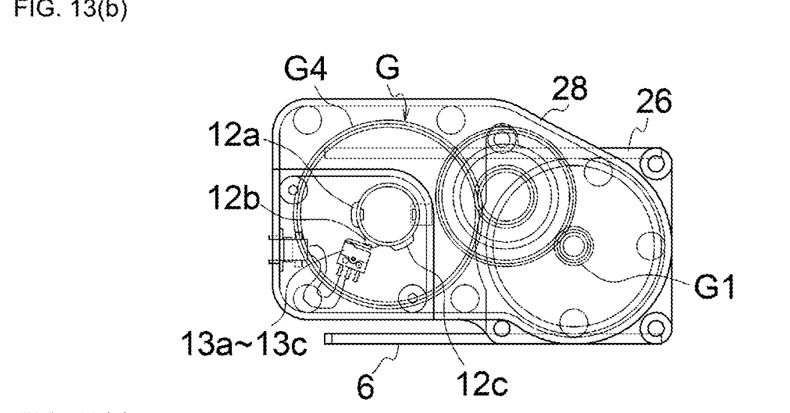
Figure 13C:
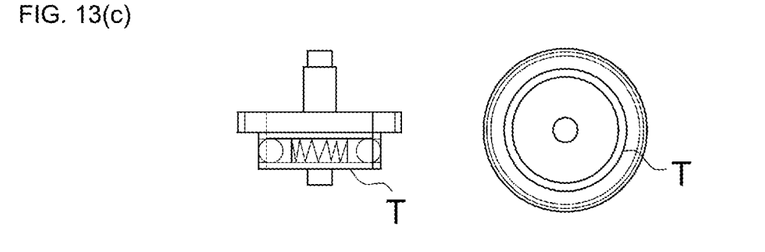

FIGS. 11 to 13 illustrate a different embodiment.

In this embodiment, a different embodiment in which a tip end of the connecting plate 6 having one end fixed to the stem 3 is fixed to the casing 25 of the motor is illustrated.

The casing 25 may have a cylindrical shape but its bottom surface is preferably formed having a flat surface at least on a spot to which the connecting plate 6 is fixed.

In this case, the gear box 28 is supported by the connecting plate 6 through the casing 25.

Arrangement of the casing 25 and the gear box 28 can be changed in various ways as illustrated in FIG. 12.

That is, by fitting the hole 6a of the connecting plate 6 with the stem 3, by turning the connecting plate 6 by using the stem 3 as an axis, and by fixing the hole 6a and the stem 3 by welding or the like, when the connecting plate 6 is fixed to the stem 3 so as to extend to the rear of the stem 3 with respect to a running attitude of the caster 1, the casing 25 can be arranged in parallel with the rotating shaft 11 in the rear of the stem 3, and the gear box 28 can be arranged on the left side or on the right side of the stem 3 (see FIGS. 12(a) and 12(c)).

Moreover, if the connecting plate 6 is fixed to the stem 3 so as to extend to the front with respect to the running attitude of the caster 1, the casing 25 can be arranged in parallel with the rotating shaft 11 in front of the stem 3, and the gearbox 28 can be arranged on the left side or on the right side of the stem 3 (see FIGS. 12(b) and 12(d)).

In the embodiment 1, the positions of the casing 25 and the gear box 28 are opposite, but four types of arrangement can be selected in accordance with applications similarly to the present embodiment.

In the illustrated example, the connecting plate is extended in the direction orthogonal to the casing 25 but it may be extended at an arbitrary angle other than the right angle.

Moreover, in the illustrated example, the case in which the positions of the gearbox 28 and the casing 25 are displaced with respect to the stem 3 at an interval of 90 degrees is exemplified, but they may be arranged at an angle other than that depending on the application.

FIG. 13 illustrates the casing 25 fixed to the connecting plate 6 and the gear box 28 fixed to the casing 25, and the gear train G in the gear box 28 is indicated by a dot line.

In this gear train G, a torque limiter T for disconnecting the gear train G is provided on the gear between gears for driving the output shaft 26 of the motor and the rotating shaft 11.

As a result, if an overload is applied to the gear train G, the gear train G can be disconnected, which is safe.

For a structure of the torque limiter T, a known structure can be used as appropriate.

Moreover, in this embodiment, too, the detectors 12a to 12c are provided on the rotating shaft of the gear driving the rotating shaft 11 of the cam or its extended portion 11', and the detection sensors 13a to 13c for detecting each of the positions of the detectors 12a to 12c can be provided in the gearbox 28 and thus, a special structure for arranging the sensors is not required.

This invention is not limited to the aforementioned embodiments but its design can be naturally changed in other various ways, that is, within a range not changing the gist of this invention.

REFERENCE SIGNS LIST 1 caster
2 wheel
3 stem
4 operation shaft
5 support yoke
6 connecting plate
10 cam
10a to 10c cam surface of braking and braking release
11 rotating shaft
12a to 12c detector
13a to 13c sensor
25 motor casing
26 output shaft
28 gear box
30 switch
40 control portion
50 target
51 controller
52 actuator
G gear train
T torque limiter

The invention claimed is:

1. An electric brake mechanism for a caster comprising:
a stem installed upright on a support yoke pivotally supporting a wheel;
a cam incorporated in an upper part of the stem and rotating by a rotating shaft;
cam surfaces for braking lock and unlocking formed in plural at predetermined spots on an outer peripheral surface of the cam;
an operation shaft abutting against the cam surface and displaced; and
a brake device for braking and releasing braking of the wheel in conjunction with the displacement of the operation shaft, wherein
a switch mounted on a target to which the caster is attached and outputting an instruction signal to the brake device, a detector provided on the rotating shaft of the cam and arranged in accordance with each position of the plurality of cam surfaces, a sensor for detecting abutment between each of the cam surfaces and the operation shaft by the detector, a motor rotating by an input of the switch and stopping when the position of the predetermined cam surface is detected by the sensor, and a gear train for transmitting rotation of the motor to the rotating shaft of the cam are provided,
with respect to a gear box in which the gear train is stored, a storage box storing the motor is fixed to the gear box by crossing the same at a right angle and extending in parallel with the same direction as the rotating shaft protruding from the gear box to the caster side,
one end of a connecting plate extending in a direction orthogonal to an extending direction of the rotating shaft is fixed to the stem of the caster, and
the connecting plate has the other end side of the connecting plate fixed to the motor and supporting the motor,
wherein
a tip end of the storage box of the motor is fixed to one of end portions of the gear box so as to be arranged at a right angle;
an output shaft of the motor is connected to a rotating shaft of a gear at a tip end which is an input side of the gear train, a rotating shaft of the gear on a rear end which is an output side of the gear train extends in the same direction as that of the rotating shaft of the gear disposed on the input side of the gear train and becomes the rotating shaft of the cam or is integrally connected to the rotating shaft of the cam; and
the connecting plate having a tip end fixed by fitting a hole provided in the tip end side with the stem of the caster is provided.

2. The electric brake mechanism for a caster, according to claim 1, wherein
each of the detectors is provided on the rotating shaft of the gear driving the rotating shaft of the cam in correspondence with a position where each of the cam surfaces abuts against the operation shaft; and
a detection sensor for detecting a position of the detector is provided in the gear box.

3. The electric brake mechanism for a caster, according to claim 1, wherein
a torque limiter for disconnecting the gear train if an overload is applied to the gear train of the gear box is provided.

4. The electric brake mechanism for a caster, according to claim 1, wherein
the brake device has a structure of performing turning regulation performing directional regulation of the wheel, double lock performing turning regulation and braking of the wheel, and unlocking releasing the regulation and braking of the wheel; and
the cam surface has a first cam surface performing the turning regulation, a second cam surface performing the double lock, and a third cam surface performing unlocking.

5. The electric brake mechanism for a caster, according to claim 1, wherein
a control portion into which an instruction signal of the switch and a detection signal of the sensor are input and outputting a control signal to the motor is provided; and
the control portion outputs a rotation driving signal to the motor by the instruction signal of the switch and outputs a rotation stop signal to the motor by the detection signal of the sensor.

6. The electric brake mechanism for a caster, according to claim 5, wherein
a detection portion for detecting stop of the wheel of the caster is provided, a detection signal of the detection portion is input into the control portion, and a control signal for performing braking lock of the caster is output to the motor if stop of the wheel lasts for a certain period of time.

7. The electric brake mechanism for a caster, according to claim 5, wherein
the control portion outputs an unlocking or turning regulation signal of the wheel of the caster while the switch is turned on and executes control so that the turning regulation/braking signal is output if the switch is released.

8. The electric brake mechanism for a caster, according to claim 1, wherein
the instruction signal of the switch is output as an instruction signal to the brake device through a delay timer circuit.

9. The electric brake mechanism for a caster, according to claim 1, wherein
the detection signal of the sensor is used as an interlock signal of the target.

10. The electric brake mechanism for a caster, according to claim 1, wherein
by fitting the hole at the tip end of the connecting plate with the stem of the caster and by changing a fixed position of the connecting plate to an arbitrary angle around the stem, arrangement of the gear box and the storage box of the motor with respect to the stem can be changed to a desired position.

11. The electric brake mechanism for a caster, according to claim 10, wherein
by changing the fixed position of the connecting plate at an interval of 90 degrees around the stem, arrangement of the gear box and the storage box of the motor with respect to the stem can be fixed to any desired position at front, rear, right or left of the stem.

* * * * *